United States Patent [19]
Zhdanovich et al.

[11] 3,821,085
[45] June 28, 1974

[54] ANTIBIOTIC-GLICOSIDE AND METHOD OF PRODUCING THEREOF

[76] Inventors: Jury Vasilievich Zhdanovich, Khoroshevskoe shosse, 5, korpus 8, kv. 21; Galina Borisovna Lokshin, Balaklavsky prospekt, 20, korpus 3, kv. 206; Alexandr Dmitrievich Kuzovkov, ulitsa Vinokurova, 5/6, korpus 2, kv. 33; Sarra Markovna Rudaya, ulitsa Nagornaya, 17, korpus 15, kv. 57; Nadezhda Konstantinovna Solovieva, Odesskaya ulitsa, 18, korpus 2, kv. 151, all of Moscow, U.S.S.R.

[22] Filed: Mar. 28, 1973

[21] Appl. No.: 345,648

Related U.S. Application Data

[62] Division of Ser. No. 60,917, Aug. 4, 1970.

[52] U.S. Cl............................................ 195/80 R
[51] Int. Cl............................................ C12d 9/00
[58] Field of Search.................................. 195/80

[56] References Cited
OTHER PUBLICATIONS

Chemical Abstracts; Vol. 74; 110415z; 1971.

*Primary Examiner*—A. Louis Monacell
*Assistant Examiner*—Robert J. Warden
*Attorney, Agent, or Firm*—Holman & Stern

[57] ABSTRACT

The present invention relates to a new antibiotic-glucoside and to a method of producing the same by culturing Actinomyces olivovariabilis sp. nov. is a nutrient medium. The new antibiotic-glycoside has the empirical formula $C_{52}H_{76}O_{24}$ and comprises aglycone chromomycinone and residues of three desoxy-sugars, two of which are identical to oliose and olivose.

5 Claims, No Drawings

ANTIBIOTIC-GLICOSIDE AND METHOD OF PRODUCING THEREOF

This is a divisional, of U.S. Pat. application Ser. No. 60,917, filed Aug. 4, 1970.

The present invention relates to a new antibiotic-glycoside and to a method of producing the same.

According to the invention, the new antibiotic-glycoside of the empirical formula $C_{52}H_{76}O_{24}$ comprises aglycone chromomycinone and residues of three desoxy-sugars, two of which are identical to oliose and olivose; the following structural formula is suggested by us for said antibiotic:

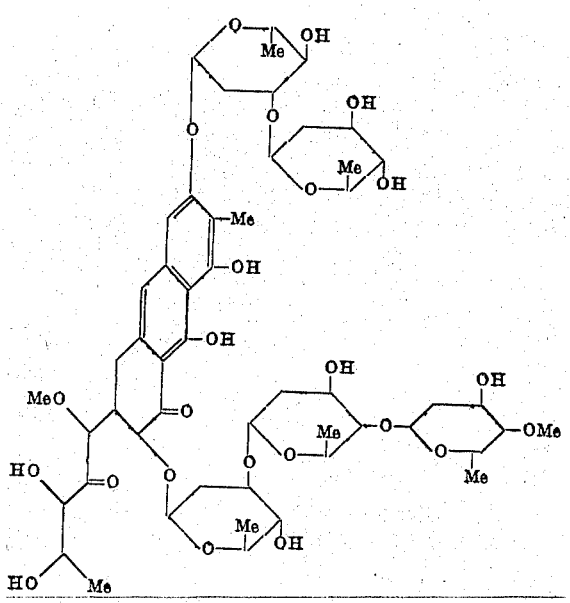

Said antibiotic-glycoside is a pharmacologically active substance and can find application as a medicinal preparation for treating malignant tumors.

According to the supposed mechanism of its action, said antibiotic inhibits DNA (desoxyribonucleic acids)—dependent synthesis of RNA (ribonucleic acids) in various biological systems, such as gram-positive and acid-resistant bacteria, tumor cells, etc.

The new antibiotic-glycoside is a yellow amorphous powder, easily soluble in alcohols and in esters, sparingly soluble in water. Its m.p. is 162°–165° C (decomp.).

The method of producing the new antibiotic-glycoside, according to the invention, consists in that the culture of *Actinomyces olivovariabilis sp. nov.* (which produces the said antibiotic-glycoside and features the following physiological properties: spiral sporophores on all the media that are disposed on short branches either singly or in clusters; the spirals are contracted and glomerular; the spores are oblong and oval, with plain envelopes; on mineral Hause medium No. 1 the growth is moderate, the colonies are flat, deeply implanted into agar, the aerial mycelium is moderately developed, velvety, dark-grey in colour; the substrate mycelium is olive-grey in colour; soluble pigment is absent; on organic Hause medium No. 2 the growth is moderate, the aerial mycelium is velvety, weakly developed, greyish-violet in colour; the substrate mycelium is dark-olive in colour; the medium is coloured the same hue as the substrate mycelium; on a medium with tyrosine the growth is moderate, the aerial mycelium is weakly developed, grey in colour; the substrate mycelium is dark-umber in colour; the culture does not form melanin, does not deliquate gelatine, peptonizes milk by the twentieth day, forms $H_2S$, does not hydrolyze starch) does not reduce nitrates; is grown on a nutrient medium containing the main sources of carbon, nitrogen and, mineral salts; on completion of the process of growing, the mycelium is separated, the filtrate of the culture liquid is acidulated to pH = 2–4, after which the antibiotic-glycoside is extracted with an organic solvent, the extract is concentrated by evaporation, the desired product is precipitated from the resulting concentrate with an organic solvent, and then isolated.

For the process of growing the culture of *Actinomyces olivovariabilis sp. nov.*, it is expedient, that the nutrient medium should have the following composition (the amounts of the constituents being specified in wt. percent): soya flour, 2; starch, 2–4; glucose, 2.0; sodium chloride, 0.5; calcium carbonate, 0.5; ammonium sulphate, 0.4; potassium dihydrogen phosphate or potassium hydrogen phosphate, 0.04; water being the balance, the pH of the medium being 6.8–7.0. The nutrient medium may also have the following composition (in wt. percent): corn steep liquor, 1 (green weight); starch, 2.0; glucose, 2.0; sodium chloride, 0.5; calcium carbonate, 0.5; ammonium sulphate, 0.4; water being the balance; the pH of the medium being 6.8–7.0.

For extracting the antibiotic-glycoside from the culture liquid after the mycelium has been separated, ethyl-acetate or butanol should preferably be used as the organic solvent.

For precipitating the desired product, it is preferable to use diethyl ether or hexane as the organic solvent.

For obtaining a chromatographically pure antibiotic-glycoside, the isolated desired product is purified by column and thin-layer chromatography methods on silica gel in chloroform-methanol or benzene-acetone systems of solvents.

The present method is effected as follows.

The culture of *Actinomyces olivovariabilis sp. nov.* is used to produce the new antiobiotic-glycoside.

This culture is a species of actinomyces that has been separated by us and is characterized by the following morphological features: the sporophores on all the media employed are spiral-shaped and disposed on short branches either singly or in clusters. The spirals are strongly contacted, have 1–3 turns, and sometimes are glomerular; the spores are oblong and oval, the envelope is plain.

On mineral House medium No. 1 the growth is moderate, the colonies are flat, deeply implanted into agar. The aerial mycelium is moderately developed, velvety, dark-grey in colour (ca. A2 according to Bondartsev, W5 by Prauser). The substrate mycelium is olive-gray, dark nut-brown in colour (H1; K5 according to Bondartsev: $C6_s–C_{or}$ according to Prauser). Soluble pigment is absent. On the Capek medium and on $CP_1$ of Krasilnikov insignificant differences in the character of growth from the above-cited medium are observed.

On a glucose-asparagine medium the growth is good, the aerial mycelium is velvety, moderately developed, grey in colour. The substrate mycelium is dark-olive, dark-bay in colour (B6, e4 according to Bondartsev).

The medium is sometimes coloured the hue of the substrate mycelium.

On a glycerine-asparagine medium the growth is good, the colonies are tuberculate, sometimes fissured. Aerial mycelium is absent. The substrate mycelium is fawn in colour ( 17 according to Bondartsev). Soluble pigment is absent.

On a starch-ammonia medium the growth is moderate. The aerial mycelium is velvety, grey in colour. The substrate mycelium is olive-grey, sometimes dark-brown in colour ( 5 according to Bondartsev, 0.5r according to Prauser). Soluble pigment is absent.

On an oat medium the growth is good. The aerial mycelium is velvety, moderately developed, dark-grey with greenish hue (K5 according to Bondartsev, C6r according to Prauser). The substrate mycelium is dark-bay, dark-olive in colour. The medium is slightly coloured the hue of the substrate mycelium; in the course of ageing the medium sometimes acquires pale-crimson colour.

On organic Hause medium No. 2 the growth is moderate. The aerial mycelium is velvety, weakly developed, greyish-violet or pale-greyish in colour ($a3$, $a6$ according to Bondartsev). The substrate mycelium is dark-olive, dark-bay in colour. The medium is coloured the hue of the substrate mycelium.

On a medium with tyrosine the growth is moderate. The aerial mycelium is weakly developed, grey in colour. The substrate mycelium is dark-umber ($n2$ according to Bondartsev), or dark-bay. Does not form melanin.

The physiological properties of the new species are as follows. It does not deliquate gelatine; peptonizes milk by the twentieth day; forms $H_2S$; does not hydrolyze starch; does not reduce nitrates.

The assimilation of carbon sources on the Preedham-Gottlieb medium is as follows:

glucose +++
arabinose ++
xylose ++
rhamnose −
raffinose −
maltose +++
sucrose +−
mannitol −
inositol ++

In the culture liquid of the actinomyces a pigment of anthocyan type has been found.

In the course of investigations a great heterogeneity of the culture has been established, said heterogeneity being manifested in a spontaneous formation of a great number of morphological and physiological varieties with persistent traits.

Said culture of *Actinomyces olivovariabilis sp. nov.* is seeded onto a nutrient medium and fermented at a temperature of 27°–28° C for 130–140 hours. Then the resulting culture liquid is filtered off from the mycelium, and the filtrate is acidulated with hydrochloric, sulphuric, or any other mineral acid to pH = 2–4, after which the desired product is extracted with an organic solvent, such as ethylacetate, butylacetate, butanol, etc. It is preferable, that the extraction should be effected with the use of ethylacetate or butanol. For enhancing the quality of the desired product, the extract is treated with an aqueous solution of sodium bicarbonate, the aqueous phase is acidulated with a mineral acid (such as hydrochloric, sulphuric, or any other) to pH = 2–4, and then the extraction with an organic solvent is repeated.

The resulting extract is concentrated by evaporation to minimum volume, and the desired product is precipitated by using an organic solvent, such as hexane, petroleum ether, diethyl ether, etc. Best results may be obtained when hexane or diethyl ether is used.

For obtaining a chromatographically pure antibiotic-glycoside, it is additionally purified by column and thin-layer chromatography methods employed in succession, on silica gel, in systems of solvents chloroform-methanol (9:1) or benzene-acetone (1:1).

For a better understanding of the present invention, given hereinabelow are examples illustrating the realization of the present method of producing our new antibiotic-glycoside.

EXAMPLE 1

5–10 vol. percent of the culture of *Actinomyces olivovariabilis sp. nov.* are seeded on a nutrient medium of the following composition (in wt. percent): soya flour, 2.0; starch, 2.0; glucose, 2.0; sodium chloride, 0.5; calcium carbonate, 0.5; ammonium sulphate, 0.4; potassium dihydrogen phosphate, 0.04; the seeding being effected in an apparatus of 100 lit. capacity. The process of fermentation is run at a temperature of 26°–28° C for 140 hrs.

Then the culture mycelium is separated by filtration, and 40 lit. of the resulting filtrate are acidulated with a 10 percent hydrochloric acid to pH = 2–2.5 (potentiometrically).

The extraction is effected thrice with ethylacetate (15, 10 and 7 lit. respectively), the combined ethylacetate extracts are washed with water for removing excess acid (the pH of water washing being about 5), and concentrated by vacuum evaporation to 0.1 of the initial volume. The concentrate is extracted thrice with a 5 percent aqueous solution of sodium bicarbonate (1, 0.5 and 0.3 lit. respectively).

The extract is acidulated with a 10 percent hydrochloric acid to pH = 2–2.5 (potentiometrically), and then thrice extracted with ethylacetate (once with 0.4 lit. and two times with 0.2 lit.). The combined ethylacetate extract is washed with water, dried over sodium sulphate, concentrated by evaporation, and the antibiotic is precipitated by using a tenfold volume of hexane.

The precipitate is filtered, washed with hexane, and dried. The yield of the non-purified desired product is 3 g. 0.5 g of the non-purified antibiotic-glycoside, dissolved in a chloroform-methanol mixture (9:1), is introduced into a column (15 × 700) filled with silica gel which does not contain iron ions.

Development and elution are carried out with the same mixture. The resulting fractions are analyzed by the thin-layer chromatography techniques in the same system of solvents. The fractions that contain the antibiotic-glycoside are combined, vacuum-evaporated until dry, dissolved in a small volume of ethylacetate, and applied onto plates with silica gel. After drying, they are chromatographed in the above-described system of solvents.

From the zone with the $R_f$ value equal to 0.55–0.6, by elution with methanol, followed by concentration under a vacuum and reprecipitation from ethylacetate with hexane, the chromatographically pure antibiotic-glycoside is obtained. The antibiotic glycoside is isolated as a yellow amorphous powder, easily soluble in methanol or ethanol, in esters, and sparingly soluble in water. The m.p. is 162°–165° C (decomp.).

Calctd., percent: C, 57.76; H, 7.02. $C_{52}H_{76}O_{24}$.
Found, percent: C, 57.90; H, 7.02

Equivalent weight (as determined by titration with a decinormal solution of caustic soda in a methanol-benzene medium) is 1,073. Calctd. for $C_{52}H_{76}O_{24}$: 1,084. $[\alpha]_D^{20} - 49° \pm 2°$ (with 0.5; ethanol). $\lambda_{max}^{methanol}$ 230; 280; 317; 330 (inflection), 412 $m\mu$ ($E_{1cm}^{1\%}$ 174, 380, 59.5, 80). $\nu$ (Nujol liquid petrolatum, cm$^{-1}$) 3,400–3,450; 1,720; 1,635; 1,580; 1,520; 1,180; 1,070; 1,010; 910; 840.

EXAMPLE 2

Up to the step of extracting the antibiotic glycoside, the process is carried out as described in Example 1.

Extraction is effected thrice with butanol (12, 8 and 5 lit.). The combined extracts are washed with a small amount of water and vacuum-evaporated to 0.3 of the initial volume. The concentrate is extracted thrice with a 5 percent aqueous solution of sodium bicarbonate (1.6, 0.75 and 0.45 lit.). The combined soda extract is acidulated by a 10 percent hydrochloric acid to pH = 2–2.5 (potentiometrically), after which it is three times extracted with butanol (once with 0.5 lit. and twice with 0.2 lit. each time). The combined butanol extract is washed with a small amount of water and evaporated until dry.

The residue is dissolved in a small amount of ethylacetate and precipitated with diethyl ether.

The yield of the antibiotic-glycoside is 2.8 g.

For obtaining a chromatographically pure antibiotic-glycoside, the product is purified by following the procedure described in Example 1.

What is claimed is:

1. A method of producing an antibiotic-glycoside of the formula

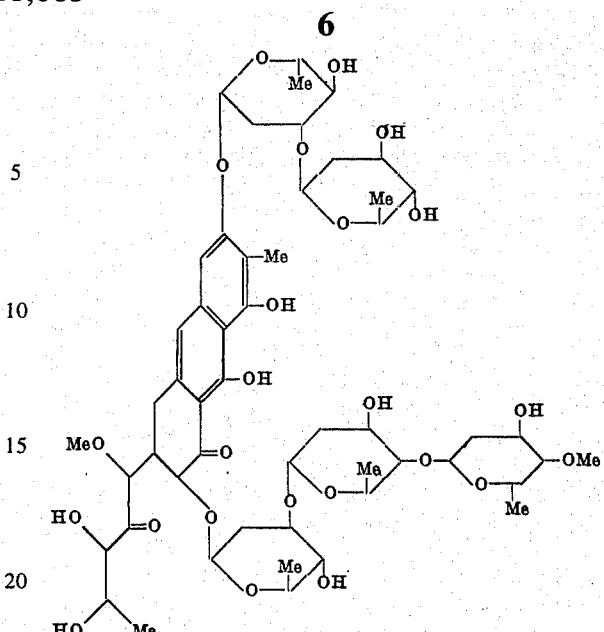

comprising growing a culture of *Actinomyces olivovariabilis sp.nov.* on a nutrient medium comprising sources of carbon, nitrogen and mineral salts; on completion of the process of growing separating the mycelium, acidulating the filtrate of the culture liquid to pH = 2–4, extracting the antibiotic-glycoside with an organic solvent, concentrating the extract, precipitating the desired product from the resulting concentrate with an organic solvent, and isolating the product.

2. A method as claimed in claim 1, wherein the nutrient medium employed has the following composition (in wt. percent): soya flour, 2; starch, 2–4; glucose, 2.0; sodium chloride, 0.5; calcium carbonate, 0.5; ammonium sulphate, 0.4; potassium dihydrogen phosphate or potassium hydrogen phosphate, 0.04; water being the balance; pH of the medium being 6.8–7.0.

3. A method as claimed in claim 1, wherein the nutrient medium employed has the following composition (in wt. percent): corn-steep liquor, 1.0, green weight; starch, 2.0; glucose, 2.0; sodium chloride, 0.5; calcium carbonate, 0.5; ammonium sulphate, 0.4; water being the balance; the pH of the medium being 6.8–7.0.

4. A method as claimed in claim 1, wherein, for said organic solvent is selected from the group consisting of ethylacetate and butanol.

5. A method as claimed in claim 1, wherein said organic solvent is selected from the group consisting of diethyl ether and hexane.

* * * * *